United States Patent [19]
Baert et al.

[11] Patent Number: 5,167,818
[45] Date of Patent: Dec. 1, 1992

[54] REINFORCED FILTERING HOSE

[76] Inventors: Jacques Baert, 5 Rue Gallilee, 77380 Combs La Ville; Bruno Thuillier, 11 Rue Mendes-France, 91700 Sainte-Genevieve-des-Bois; Maria Bianco, 11 Grande Rue, 91100 Corbeil Sur Essonne, all of France

[21] Appl. No.: 657,023

[22] Filed: Feb. 15, 1991

[30] Foreign Application Priority Data

Feb. 19, 1990 [FR] France .................. 90 01952

[51] Int. Cl.⁵ ............................ B01D 29/13
[52] U.S. Cl. .................. 210/321.87; 210/450; 210/455; 210/497.01; 210/500.23; 55/502
[58] Field of Search ............ 210/450, 356, 321.78, 210/321.87, 500.23, 321.67, 455, 497.01; 55/502, 503, 511

[56] References Cited

U.S. PATENT DOCUMENTS

| 3,451,197 | 5/1967 | Ballard. | |
|---|---|---|---|
| 4,276,069 | 6/1981 | Miller. | |
| 4,293,321 | 10/1981 | Kordas. | |
| 5,002,667 | 3/1991 | Kutowy et al. | 210/456 |
| 5,004,542 | 4/1991 | Lyons et al. | 210/450 |

FOREIGN PATENT DOCUMENTS 1878264 5/1963 Fed. Rep. of Germany.
2032045 4/1980 United Kingdom.

Primary Examiner—Robert A. Dawson
Assistant Examiner—Wanda L. Millard

[57] ABSTRACT

A reinforced gas filter conduit where the conduit contains an interior stiffening band attached to a securing band which is adhered to the interior circumference of the conduit.

7 Claims, 2 Drawing Sheets

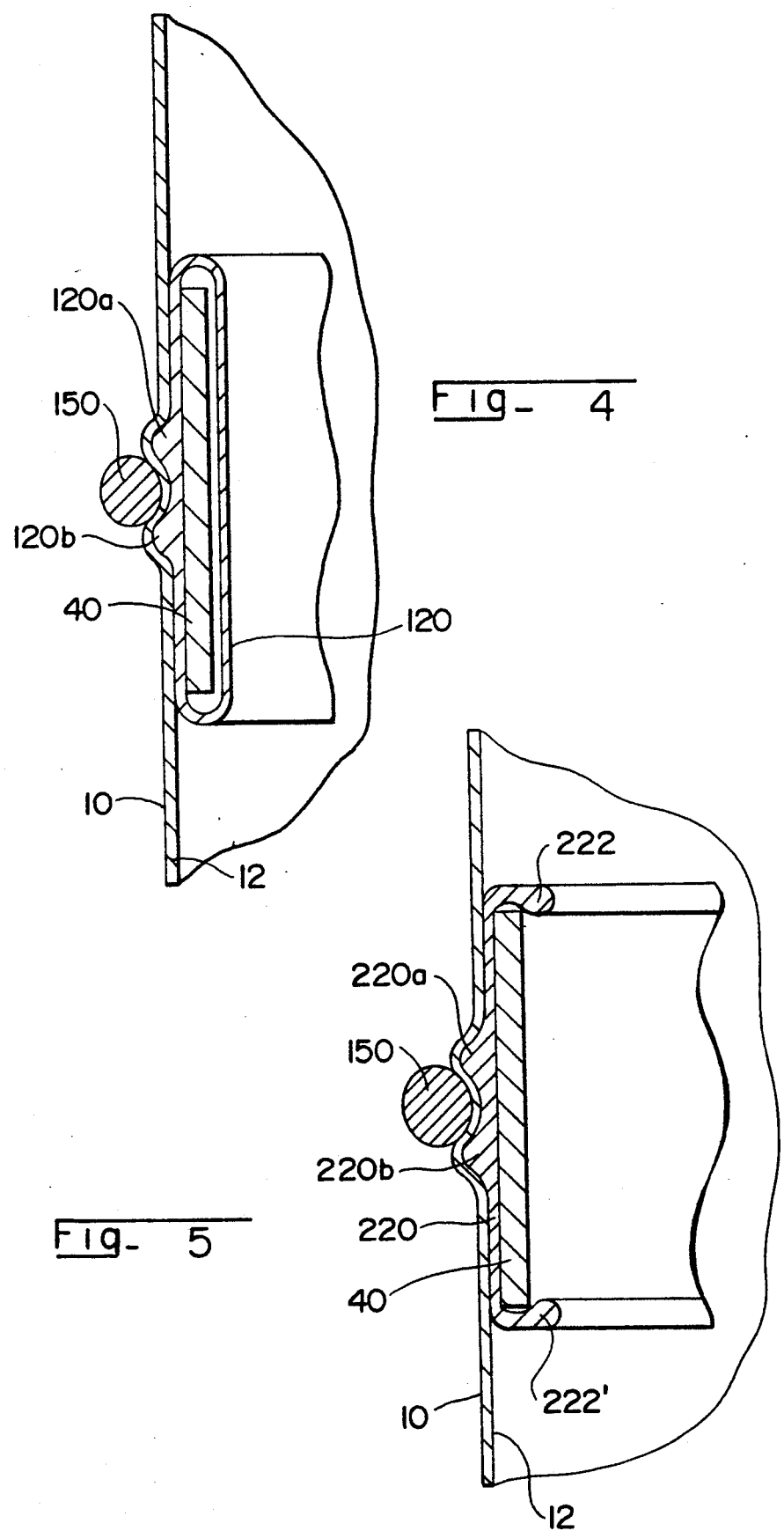

REINFORCED FILTERING HOSE

FIELD OF THE INVENTION

The present invention concerns a filtering tube or conduit for gases such as air.

BACKGROUND OF THE INVENTION

In the filtration of air to purify it, it is known to introduce the air into essentially cylindrical hoses manufactured from filtering material, so as to make the air pass through the material and arrest impurities inside the hose.

When such hoses have to be of considerable length, and/or when the pressure of the air to be filtered is weak, or when the current of air or some other gas has to be inverted so as to clean the filtering material, it is necessary to stiffen such hoses at regular intervals with braces to prevent them from retracting or collapsing upon themselves.

A cross-section of a known reinforced filtering tube or hose is shown in FIG. 1. Filtering material (1) of which the hose is made is surrounded by a band (2) of an essentially rigid stiffener, made out of metal or plastic, for example, and a covering band (3) of material (for example, of the same material as the filtering material) is placed so as to cover band (2), and is attached to the filter material (1) on either sides of the band (2), usually by a pair of sewn seams (4,4') on both sides. A similar structure is also known in which band (2) and covering band (3) are situated inside the hose.

This hose has a major drawback. The presence of numerous stitches on both sides of band (2) causes local damage to the filtering material (1), since the thread of the seam stitching passes through this filtering material at regular intervals. More precisely, those stitches inevitably form a large number of small holes via which the dust and other impurities can get through to the filter. Thus, the quality of filtration is substantially reduced.

The present invention eliminates the disadvantage of previous technology, and provides a filtering hose or tube with stiffening bands in which securing the bands in their place does not cause any deterioration to the filtering quality.

SUMMARY OF THE INVENTION

Thus the invention comprises a tubular filter comprising a tube of filtering material which is permeable to air but impermeable to particulate matter, and at least one annular stiffening ring constructed to fit against the interior circumference of said tube, and means for securing said annular stiffening ring in place, characterized in that:

(a) said annular stiffening ring is comprised of band provided inside said tube and adapted to expand outwardly elastically towards the interior circumference of said tube; and (b) said means for securing said annular stiffening ring in place comprises:

(i) an annular securing band adapted to fit and to hold said annular stiffening band in place therein; and (ii) means for attachment of said annular securing band to the interior circumference of said tube.

BRIEF DESCRIPTION OF THE DRAWINGS

FIG. 4 is a partial cross-section of a second embodiment of the invention.

FIG. 5 is a partial cross-section of a third embodiment of the invention.

DESCRIPTION OF THE INVENTION

Figure 1:
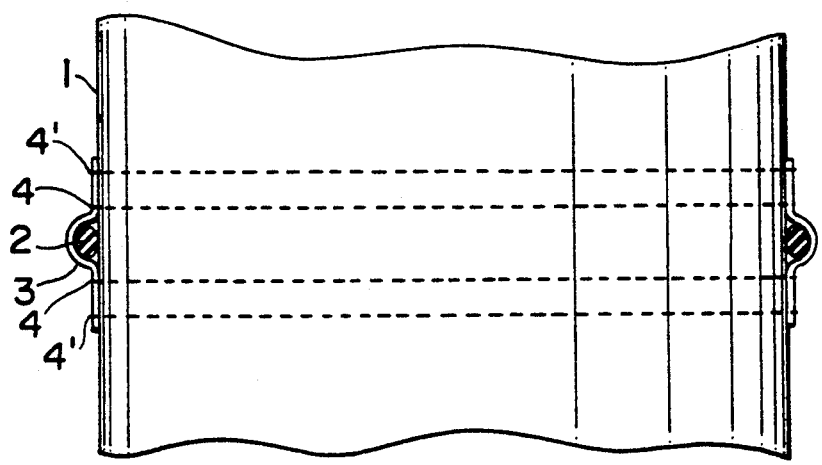
FIG. 1 is a drawing of a prior art device and has already been discussed.
Figure 2:
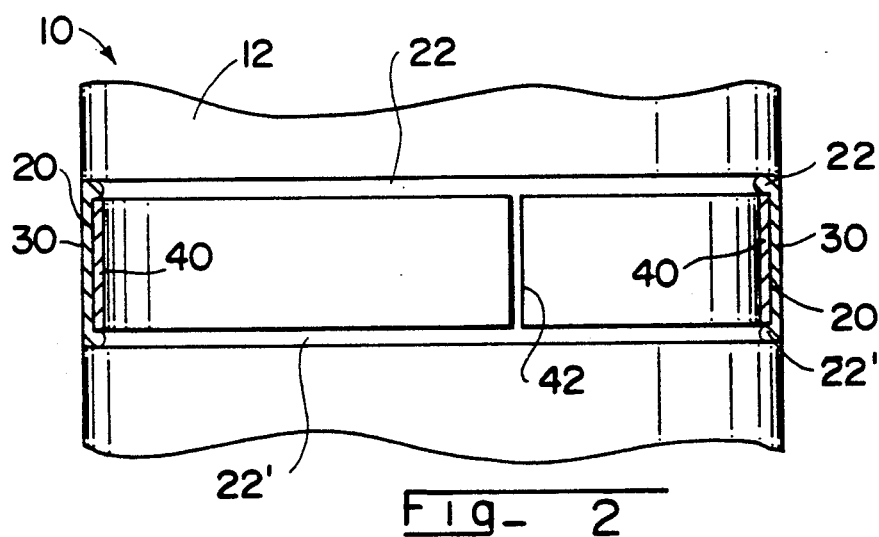
FIG. 2 is an axial view of a first embodiment of the filtering hose according to the invention.
Figure 3:
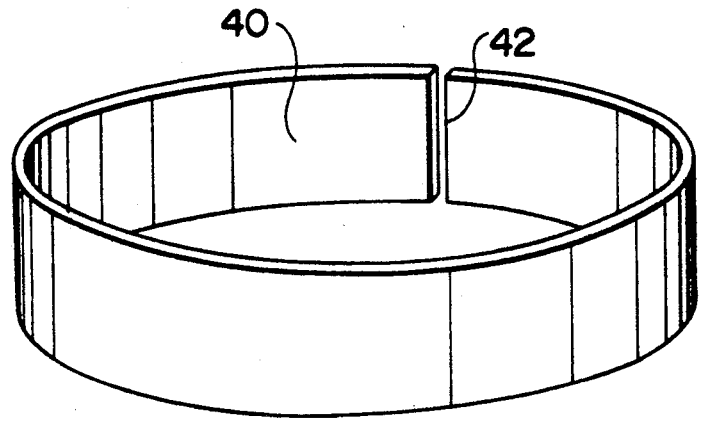
FIG. 3 is a perspective view of one of the elements represented in FIG. 2.

With reference now to FIG. 2 & 3, what is represented is a partial view of the filtering conduit, i.e., a hose or tube, (10) which is made up of a tube of filtering material (12), which can be made from a sheet rolled and closed upon itself in a usual manner and sealed by a longitudinal seam (not represented). The filtering material may be, for example, a membrane made up of a microporous membrane such as expanded polytetrafluoroethylene.

In order to make sure that the hose retains approximately a given shape when mechanical or pneumatic forces are applied against it, a certain number of stiffeners (40) are placed along the hose. One such stiffener is represented in FIG. 3.

Referring to FIG. 2, an annular securing band (20), fabricated, for example, from non-woven material such as felt, is formed into a annular band and is attached to the internal surface of the material (12) of the hose (10), preferably by a single seam (30) extending along the entire periphery of the cross section of the hose, and it is situated at the middle of the band (20), as shown. If necessary, the seam (30) may be replaced by two seams located close to each other, so as to make the attachment more solid. In addition, the attachment seam may be replaced by an equivalent device such as an adhesive cord.

The securing band, in the present example, has along its entire lower and higher border a retention collar (22) & (22') respectively, which can be formed by rolling the material of the band upon itself. The collar hangs toward the inside of the hose for reasons explained later.

The stiffening band (40) is shown in more detail in FIG. 3. This band may be fabricated of steel or the like, and it has a certain elasticity. Its profile is generally flat and its height equal or slightly smaller than the distance between the borders of the opposing collars (22, 2240) of the band (20). The band (40) is cut through its width at (42) following a line which can be parallel or oblique with respect to the longitudinal axis of the tube in order to impart a requisite degree of elasticity or springiness.

The cut (42) allows the stiffening band (40) to contract and be fitted into the hose (10). When the stiffening band (40) is placed in front of the securing band (20), it expands so as to fit tightly, by getting back into its original shape, with the said securing band. As shown in FIG. 2 the collars (22,22') of the said band prevent the ring from sliding in the longitudinal direction on the hose or to take an oblique position with respect to the longitudinal axis A of the hose.

One of the advantageous aspects of this invention is that the pressure exercised by the stiffening band (40) against the securing band (20) prevents air, or some other filtrated gas, from reaching the seam (30), and, consequently, makes it impossible for certain small size impurities to get through the filtering material (12) in the area of this seam which is made partially permeable by those impurities as explained above.

A filtering hose of great length may include several stiffeners, like the one described above, which may be placed at regular or irregular intervals.

In addition, in certain cases, the securing band (20) may consist of only the lower collar (22') with the stiffener band (40) adhering to it due to gravity.

In addition, the collars (22,22') may be replaced by overhangs which do not necessarily stretch along the entire length of the band (20). The important thing consisting in securing the band (40) so as to hold it in place.

Also, band (40) need not be cut at (22), if the material of which the band is made permits the contraction and expansion necessary for placing the band inside the hose, and later on expanding to form a tight fit.

Now with reference to FIG. 4, a first variant embodiment of the invention is described.

The stiffening band (40) is enclosed in a hollow flat sheath (120) which closely surrounds it. The sheath is made for instance of non-woven fabric such as felt.

The sheath comprises at its outer surface two parallel circular beads (120a) and (120b) which extend at a predetermined distance from each other.

The stiffener assembly further comprises a rigid O-ring (150) which extends outside the filtering hose (10) and whose internal diameter is approximately equal to the diameter of the hose.

The stiffening band, together with its sheath, is inserted into the hose as explained above, and at the same time the ring is maintained in position so that said ring (150) is at a level intermediate between beads (120a, 120b). When the band (40) is released and expands radially, the ring (150) is tightly caught between beads (120a, 120b), and at the same time the hose material (12) is pinched with high friction between the ring and the sheath.

The stiffening assembly is therefore firmly secured at the desired level on the hose, with an extremely simple operation.

It should be observed that this variant stiffener assembly does not involve any seam or the like on the hose (10), so that the construction and assembly is further simplified.

Another variant embodiment will now be described with reference to FIG. 5.

The sheath (120) of FIG. 4 is here replaced by a securing band (220) which is similar to securing band (20) of FIG. 2 in that it comprises two internally protruding collars (222, 222') at its upper and lower edges, respectively.

On the outer surfaces of the band (20) are provided two circular parallel beads (220a, 220b) similar to beads (120a, 120b) of FIG. 4.

An O-ring (150) is provided at the outside of the hose (10).

The stiffening band (40) and the securing band (220) are first assembled together, with the collars (222, 222') retaining the band (40) in position inside the securing band 220.

This assembly is then inserted into the hose (10) by deforming the band (40) as explained above, and the ring is maintained in a position such that the O-ring (150) and the beads (220a, 220b) come into registration.

When the stiffening band (40) is released and expands outwardly, the ring (150) is tightly caught between beads (220a, 220b) and the hose material is pinched therebetween as illustrated to secure the stiffener assembly at the desired level.

Here again, no seam or the like is required.

We claim:

1. A tubular filter (10) comprising a tube of filtering material (12) which is permeable to air but impermeable to particulate matter, and at least one annular stiffening ring constructed to fit entirely against the interior circumference of said tube, and means exterior of said tube for securing said annular stiffening ring in place, characterized in that:
   (a) said annular stiffening ring is comprised of band (40) provided inside said tube and adapted to expanded outwardly elastically towards the interior circumference of said tube; and
   (b) said means for securing said annular stiffening ring in place comprises:
      (i) an annular securing band (20;120;220) adapted to fit and to hold said annular stiffening band in place therein; and
      (ii) means (30;150;120a,120b;220a,220b) for attachment of said annular securing band to the interior circumference of said tube.

2. A tubular filter according to claim 1, wherein said attachment means comprise a seam (30).

3. A tubular filter according to claim 1, wherein said annular securing band comprises along at least one of its borders an overhang (22,22';222,222') facing toward the interior of the tube for fitting and holding said annular stiffening band.

4. A tubular filter according to claim 1, wherein said annular securing band (20;120;220) is made of felt.

5. A tubular filter according to claim 1, wherein said annular stiffening band (40) is split.

6. A tubular filter according to claim 1, wherein said attachment means comprise a pair of beads (120a, 120b; 220a,220b) formed on the outer surface of said annular securing band and a ring (150) provided outside said tube and adapted, upon elastic expansion of said annular stiffening band, for interengagement with said pair of beads, the tube material (12) being pinched between said ring and said pair of beads.

7. A tubular filter according to claim 1, wherein said annular securing band (120) is in the form of a sheath closely surrounding said annular stiffening band (40).

* * * * *